(12) United States Patent
Kemkemian et al.

(10) Patent No.: US 8,258,997 B2
(45) Date of Patent: Sep. 4, 2012

(54) RADAR DEVICE FOR DETECTING OR TRACKING AERIAL TARGETS FITTED TO AN AIRCRAFT

(75) Inventors: Stéphane Kemkemian, Paris (FR); Myriam Nouvel, Elancourt (FR)

(73) Assignee: Thales (FR)

( * ) Notice: Subject to any disclaimer, the term of this patent is extended or adjusted under 35 U.S.C. 154(b) by 0 days.

(21) Appl. No.: 12/698,987

(22) Filed: Feb. 2, 2010

(65) Prior Publication Data

US 2011/0187581 A1    Aug. 4, 2011

(51) Int. Cl.
*G01S 13/00* (2006.01)
(52) U.S. Cl. .......................... 342/29; 342/154
(58) Field of Classification Search .......... 342/29
See application file for complete search history.

(56) References Cited

U.S. PATENT DOCUMENTS

| | | | |
|---|---|---|---|
| 3,921,177 A | 11/1975 | Munson | |
| 4,996,532 A | 2/1991 | Kirimoto et al. | |
| 5,087,917 A | 2/1992 | Fujisaka et al. | |
| 5,598,163 A * | 1/1997 | Cornic et al. | 342/70 |
| 2005/0012655 A1 * | 1/2005 | Lalezari et al. | 342/62 |
| 2007/0216529 A1 | 9/2007 | Hobden et al. | |

FOREIGN PATENT DOCUMENTS

| | | |
|---|---|---|
| EP | 1 826 732 A2 | 8/2007 |
| FR | 2 226 760 A1 | 11/1974 |
| JP | 2005-290796 A | 10/2005 |

OTHER PUBLICATIONS

Malmqvist, R.; Samuelsson, C.; Gustafsson, A.; Boman, T.; Bjorklund, S.; Erickson, R.; Vaha-Heikkila, T.; Rantakari, P., On the Use of MEMS Phase Shifters in a Low-Cost Ka-band Multifunctional ESA on a Small UAV, Dec. 11, 2007,Microwave Conference, 2007. APMC 2007. Asia-Pacific, pp. 1-4.*
Robert Malmqvist, et al., "On the Use of MEMS Phase Shifters in a Low-Cost Ka-band Multifunctional ESA on a Small UAV", Asia-Pacific Microwave Conference, Dec. 11, 2007, pp. 1-4, IEEE, Piscataway, NJ, USA.
J. Clayton Keree, et al., "Phase-Only Transmit Beam Broadening for Improved Radar Search Performance", Radar Conference, Apr. 1, 2007, pp. 451-456, IEEE.

(Continued)

*Primary Examiner* — Timothy A Brainard
(74) *Attorney, Agent, or Firm* — Baker & Hostetler, LLP (57) ABSTRACT

A radar device includes means for emitting microwave-frequency signals; means for receiving signals reflected by a target; computation means; a plurality of antenna systems disposed around the aircraft, an antenna system comprising a set of emission antennas coupled to the emission means and a set of reception antennas coupled to the reception means, each antenna system being dedicated to the coverage of a given angular sector $\Omega$; for a given antenna system, the antenna beam on reception being formed by CBF by the computation means on the basis of the signals received by the reception antennas and the antenna beam on emission is pointed by an electronic scanning system in a number greater than or equal to two of directions inside the given angular sector $\Omega$. The invention applies notably in the field of airborne radars, in particular radars with large angular coverage and short range that are necessary for example for carrying out a function of the "see and avoid" type on drones, which function is also commonly called "Sense & Avoid".

2 Claims, 4 Drawing Sheets

OTHER PUBLICATIONS

F.E. Van Vliet, et al., "Front-End Technology for Phased-Arrays with Digital Beamforming", IEEE International Conference on Microwaves, Communications, Antennas, and Electronic Systems, May 13, 2008, pp. 1-3, IEEE, Piscataway, NJ, USA.

Butler J.L., "vol. III Array Systems; Chapter 3 Digital, Matrix, and Intermediate-Frequency Scanning; Section2: Digital Delay Phase Switching" in: R.C. Hansen, "Microwave Scanning Antennas", Jan. 1, 1966, pp. 222-240, vol. 3, Academic Press, NY, USA.

* cited by examiner

RADAR DEVICE FOR DETECTING OR TRACKING AERIAL TARGETS FITTED TO AN AIRCRAFT

FIELD OF THE INVENTION

The present invention relates to a radar device for detecting or tracking aerial targets fitted to an aircraft. It applies notably in the field of airborne radars, in particular radars with large angular coverage and short range that are necessary for example for carrying out a function of the "see and avoid" type on drones, which function is also commonly called "Sense & Avoid".

BACKGROUND OF THE INVENTION

The systems provided for carrying out the "Sense & Avoid" function on board drones use conventional radars operating in the millimeter band, for example in the Ku or Ka bands, which are derived from radars provided for other functions. The current state of regulations does not permit the flight of automatic craft within the general air traffic.

These conventional systems are equipped with a rotary mechanical antenna. They have a naturally slender beam because of their high operating frequency. They thus allow precise tracking, on the other hand, their scan speed must be very high to cover an angular domain suited to a function of "Sense & Avoid" type at a sufficient rate. Typically, such a function ought to cover an angular field comparable to a pilot's angle of vision, i.e. about ±110° in azimuth and 40° in elevation. The angular coverage constraint is therefore only partially satisfied. Moreover, these conventional systems require a protuberance of the drones since they cannot be placed directly on their structure, thus posing aerodynamism or bulkiness problems.

Conventional electronic scanning, using a slender formed beam, can solve this fast coverage problem, but it exhibits the drawbacks of the complexity of the time allocated to the processing of a given direction, which becomes extremely small on account of the angular field to be covered in a given timescale. One solution for solving these problems is to use a computational beamforming system, termed CBF. Indeed, a CBF system makes it possible to carry out continuous observation of a plurality of direction by means of slender beams formed simultaneously by computation, and makes it possible to overlay one or more antenna systems directly onto the structure of a drone, or of any other aircraft, without significant additional bulkiness, since it is no longer necessary to provide for antenna rotation.

An exemplary simple CBF system operates in the following manner:
a certain number of CBF antenna systems are distributed over an aircraft so as to cover the whole of the domain to be monitored, each of the systems being composed:
of a wide-field emission antenna associated with an emission system placed as close as possible so as to minimize losses, in practice the maximum coverage of a wide-field antenna overlaid on an aircraft structure being at the maximum about ±60°, at least two systems then being necessary in order to cover the above-mentioned domain;
of N reception antennas placed in an array, each having, at least, the same individual angular coverage as the emission antenna, each of these antennas being associated, as closely as possible, directly with a receiver so as to minimize losses, thus making it possible to obtain low loss at reception;

The range R of a radar monitoring a certain solid angle is given by the following proportionality relation:

$$R^4 \propto \frac{P_E T A_R \sigma(\lambda)}{L \cdot \Omega} \tag{1}$$

where $P_E$ represents the power emitted, $A_R$ the reception antenna surface area, $\lambda$ the wavelength, $\sigma(\lambda)$ the equivalent radar cross section of the target, denoted RCS, which may be dependent on the length $\lambda$, T the repetition period of surveillance of the domain of solid angle $\Omega$ and L the microwave frequency losses. This relation assumes that the emission antenna pattern exactly covers the domain $\Omega$. This condition fixes the gain of the emission antenna.

It is apparent that if the RCS of the target is independent of wavelength, so also is the surveillance range.

However, this simple solution exhibits a drawback as soon as a tracking and precise angular location function is necessary. Indeed:
if the chosen frequency band is low, for example the L band, the number of modules necessary to cover the reception area $A_R$ is small, therefore the cost low, but the lobes formed by computation are wide, therefore hardly favourable to angular precision;
if the chosen frequency band is high, for example the X band and beyond, the number of modules necessary to cover the reception area $A_R$ is high and the cost becomes prohibitive, moreover the distance-speed ambiguity conditions are hardly favourable to the X band, on the other hand the lobes formed by computation are slender and therefore favourable to angular precision.

A good compromise is to work in the S band. Moreover the constraints related to spectral congestion are less critical than in other neighbouring bands. The choice of this band is more favourable than the L band notably from an angular precision point of view, but the location precision problem remains. Indeed, the coverage of the emission antenna is well suited to the search domain but is unsuited to the domain necessary when tracking. When tracking, the majority of the energy emitted is lost in directions where the target cannot be present since its position is then known a priori. This results in a needless loss of the signal-to-noise ratio, S/N, in relation to conventional radar systems.

SUMMARY OF THE INVENTION

An aim of the invention is notably to allow the embodiment of an emission device for CBF radar suited at one and the same time to the surveillance phase and to the tracking phase, and economical to implement. For this purpose, the subject of the invention is a radar device for detecting and/or tracking aerial targets fitted to an aircraft, comprising at least:
means for emitting microwave-frequency signals;
means for receiving signals reflected by a target;
computation means;
a plurality of antenna systems disposed around the aircraft, an antenna system comprising a set of emission antennas coupled to the emission means and a set of reception antennas coupled to the reception means, each antenna system being dedicated to the coverage of a given angular sector $\Omega$;
for a given antenna system, the antenna beam on reception being formed by CBF by the computation means on the basis of the signals received by the reception antennas and the antenna beam on emission is pointed by an electronic scanning system in a number greater than or equal to two directions inside the given angular sector Ω.

The given angular sector Ω is for example the search domain to be covered by the said device.

An antenna system comprises for example at least:
- a set of P emission antennas, P being greater than or equal to 1, coupled to Q emission pathways, Q being greater than or equal to 1, the antennas being grouped into Q groups, each group being fed through an emission pathway;
- an array of N reception antennas, associated with a number M of reception pathways.

The electronic scanning system is for example composed of phase shifters with n states disposed in the emission pathways, the pathways being fed simultaneously through one and the same microwave-frequency signal, the orientation of the beam is dependent on the combination of the phase shifts on the various phase shifters.

Advantageously, the phase shifters are for example phase shifters with one state. In this case, the orientation of the beam is for example obtained by binary switching of two microwave-frequency paths of different lengths upstream of power amplifiers.

A phase shifter comprises for example a delay line and a switch in parallel.

BRIEF DESCRIPTION OF THE DRAWINGS

Other characteristics and advantages of the invention will become apparent with the aid of the description which follows offered in relation to appended drawings which represent.

Figure 1:
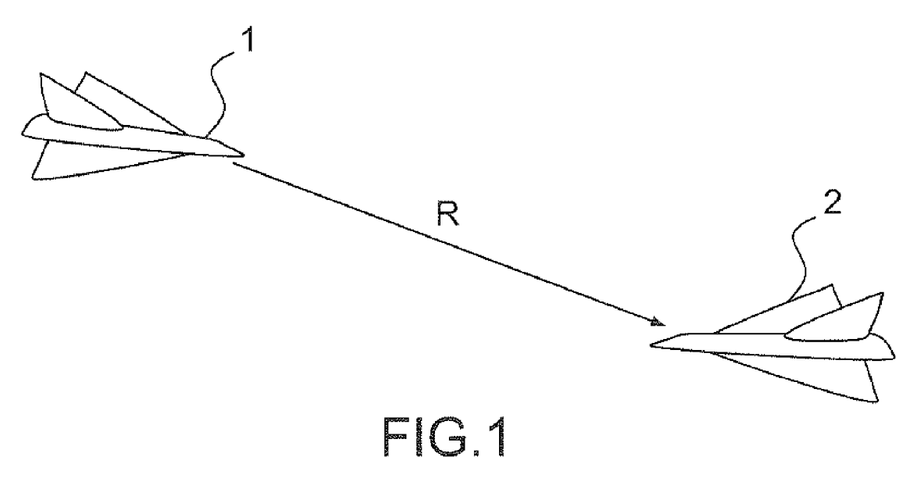
FIG. 1, an illustration of an aircraft equipped with a radar system in the operational phase.

FIG. 1 illustrates by way of example an aircraft 1 equipped with a radar able to operate in surveillance mode and in tracking mode. If one wishes to detect a target 2 of given RCS at a distance R, it is necessary to obtain a signal-to-noise ratio, S/N, greater than a given threshold. The angular precision σ obtained after a cycle of duration T is given by Woodward's formula which in the present case provides the following proportionality relation:

$$\sigma \propto \frac{\theta_R}{\sqrt{P_E T G_E A_R}} \quad (2)$$

where $\theta_R$ is the aperture of the lobe formed during reception in the direction of measurement, for example in elevation. This aperture is related to the size of the antenna, T is the integration time, for example equal to one second, which is also the rate of renewal of the measurements in a conventional DBF (Digital Beam Forming) solution. $G_E$ is the gain on emission, $A_R$ is the surface area of the reception antenna and $P_E$ the power emitted.

It is apparent from relation (1) that:
- T not being able to exceed a certain value for system reactivity constraints;
- $A_R$ being chosen, for example, for constraints of maximum bulkiness;
- the sought-after angular coverage Ω conditioning the gain $G_E$; it follows that the only adjustment parameter for obtaining the range is the emission power $P_E$. The latter is for example chosen to be only just necessary to obtain the detection of the target during surveillance, notably for cost and consumption reasons.

In a conventional DBF solution, all the parameters are fixed by the operating conditions during surveillance. To obtain greater measurement precision, it is then necessary to track the target over a certain number k of sequences of duration T. The drawback of this scheme is that the target has approached significantly closer during this time k×T. To obtain the sought-after precision at a given distance R, it is necessary to detect the target at a greater distance R' given by the following relation:

$$R' = R + k V_{RR} T \quad (3)$$

$V_{RR}$ being the closing speed of the target.

The ratio R'/R is all the higher as the radar system is short range. Obtaining the range R' therefore requires that the emission power $P_E$ be significantly increased, this being very penalizing notably from the cost and consumption point of view.

A less penalizing solution during tracking consists in splitting the domain to be covered Ω into a certain number m of sub-domains ω, m being greater than or equal to 2. In the surveillance phase, the renewal time of the measurements T is divided into a certain number m of smaller elementary intervals $T_p$ such that $$T = \sum_{i=1}^{m} T_P(i).$$

In a simple case, all the sub-intervals $T_p$ are equal and their value is:

$$T_P = T \frac{\omega}{\Omega}.$$

Each of the sub-domains ω is observed by introducing a simplified electronic scan on emission. The electronically controlled emission beam corresponds to an increased antenna gain:

$$G_E(\omega) = G_E \frac{\Omega}{\omega}.$$

It is therefore seen that the product of the antenna gain on emission times the processing gain proportional to the observation time $T_p$ remains constant whatever the partitioning of the domain to be covered Ω into sub-domains ω. The range and the angular precision in the surveillance phase are therefore unchanged with respect to a simple CBF solution.

On the other hand, in the tracking phase, the emission beam can be constantly pointed at the sub-domain (known a priori) where the target is situated. We therefore have $T_P=T$, but the gain on emission is $$G_E(\omega) = G_E \frac{\Omega}{\omega}.$$

Equation (2) therefore shows, all other things being equal, that the angular measurement error σ has been reduced by factor $$\sqrt{\frac{\Omega}{\omega}}.$$

Under these conditions, the required angular precision is achieved by tracking after a number of sequences of duration T $$k_\omega = k\sqrt{\frac{\omega}{\Omega}}.$$

The detection range necessary for establishing a track of required precision is now only $$R' = R + kV_{RR}T\sqrt{\frac{\omega}{\Omega}}.$$

Figure 2:
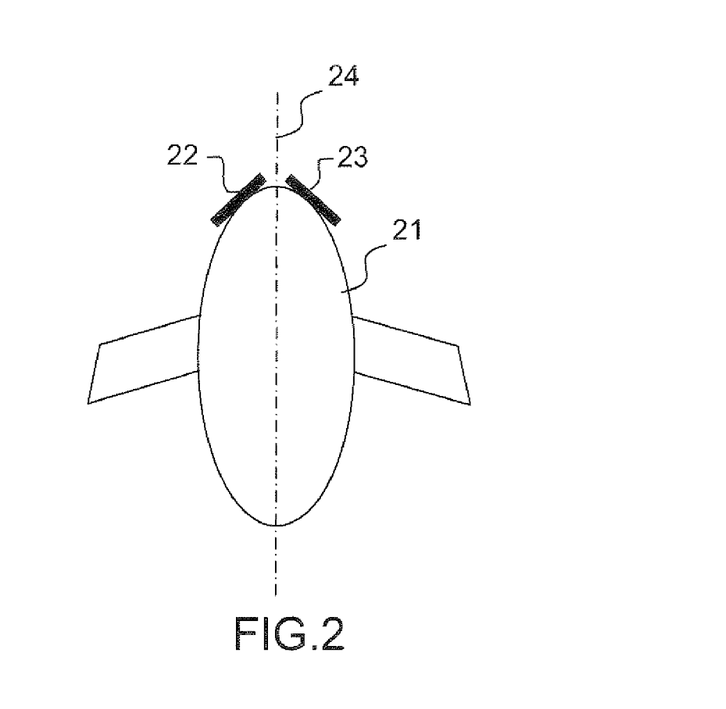
FIG. 2, by way of example a device according to the invention fitted to an aircraft.

FIG. 2 illustrates an exemplary setup of a device according to the invention on an aircraft 21, for example a drone. In the example of FIG. 2, the device comprises two antenna systems situated at the front of the aircraft 21.

More generally a device according to the invention can comprise a plurality of antenna systems, each antenna system being dedicated to the coverage of a given angular sector Ω.

An antenna system comprises at least:
a set of P emission antennas, P being greater than or equal to 1, this set being associated with a number Q of emission sources, Q being greater than or equal to 1;
an array of N reception antennas, associated with a number M of reception pathways.

In a preferential embodiment, the M reception pathways are digitized as far upstream as possible towards the antennas, in particular for reasons of cost and of ease of implementation of the CBF. This signifies notably that the signals received are sampled and then digitized by means of sampling and analogue-digital conversion circuits disposed as close as possible to the antennas. The signals thus digitized are thereafter processed by the digitized reception circuits and then transmitted to computation means, these means performing notably the CBFs and then the associated radar processings.

The emission sources conventionally comprise frequency generating circuits as well as power amplifiers, or emitters, providing the emission signals for the antennas.

Preferably, the emitters are situated as close as possible to the emission antennas and the receivers, notably the low noise amplifiers and the analogue-digital converters, are situated as close as possible to the reception antennas. The emission part is for example situated near the reception part. This makes it possible notably to reduce the losses inherent to the links between the antennas and the microwave-frequency functions in the global energy balance of the device and to obtain a compact system.

The emission and reception circuits as well as the computation and signal processing means are for example disposed inside the aircraft.

It is also possible to include the whole in antennas termed "smart antennas" devised on the surface: the circuits are then physically outside the aircraft.

The antennas are for example radiating sources, several known embodiments possibly being used, such as "patch" sources for example.

The exemplary embodiment of FIG. 2 comprises two antenna systems 22, 23 oriented approximately at +45° and −45° to the axis 24 of the aircraft so as to cover a domain of ±110° in azimuth.

Figure 3:
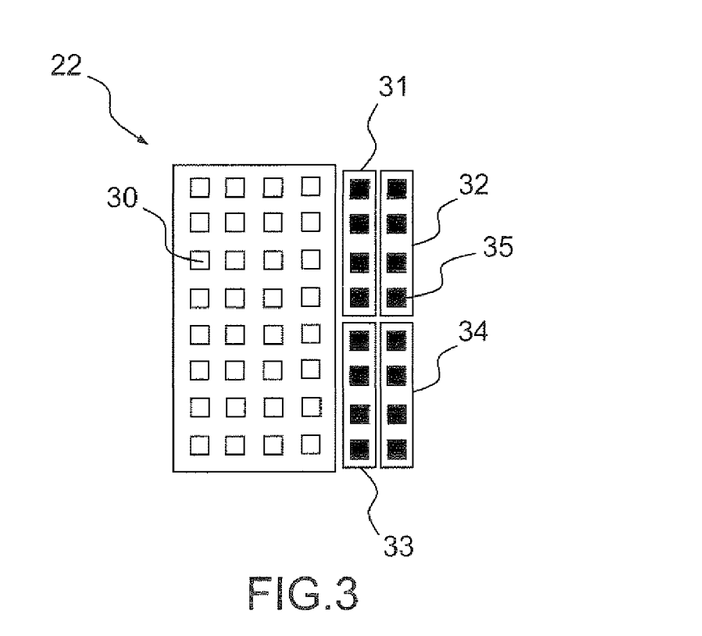
FIG. 3, an exemplary embodiment of an antenna system included in a device according to the invention.

FIG. 3 illustrates an exemplary embodiment of an antenna system 22, 23, for example intended for a "Sense & Avoid" function. In this example, an antenna system contains:
for reception, N=32 reception antennas 30 and M=32 reception pathways;
for emission, 4 groups 31, 32, 33, 34 of 4 antennas 35, each group being fed through an associated emission circuit.

The device therefore comprises 32 reception pathways and 4 emission circuits.

The two antenna systems can emit in alternation or else, preferably, simultaneously. It suffices for this purpose that the two emissions of the two antenna systems are synchronous and emit orthogonal waveforms.

It should be noted that the spacing between the pathways, whether on emission or on reception, is not necessarily close to λ/2, λ being the length of the emitted wave. The choice of the spacing is notably dependent on the patterns sought as a function of a given application.

Figures 4, 5:
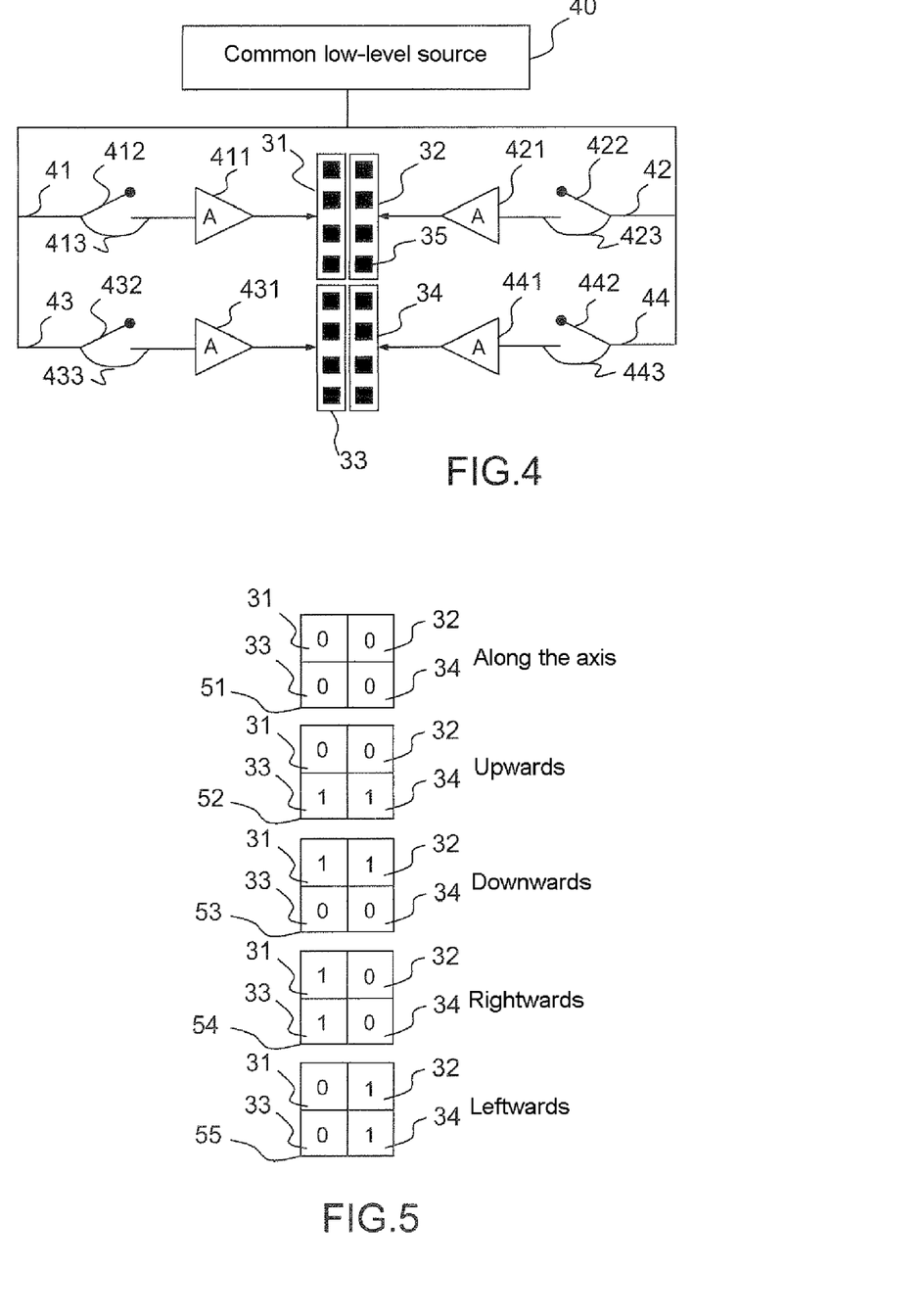
FIG. 4, an exemplary embodiment of the emission means of a device according to the invention.
FIG. 5, an exemplary coding of the phase shifts applied in the various emission pathways of an antenna system.

FIG. 4 presents an exemplary application of the associated emission pathways. A common source 40 provides a low-level microwave-frequency signal for the set of emission pathways 41, 42, 43, 44. Inside an emission pathway, each power amplifier 411, 421, 431, 441 is preceded by a binary phase-shift system, coded on one bit.

This phase-shift system is for example effected by switch means 412, 422, 432, 442 which short-circuits a delay line 413, 423, 433, 443 of around λ/4, the precise value of the delay adjusting the various pointings of the emission beam. The short-circuit can be for example effected simply through a diode turned on or off by a control voltage. Such a phase-shift system is simple and inexpensive. The amplifier of each emission pathway feeds the antennas 35 of the group of antennas 31, 32, 33, 34 associated with this emission pathway.

The common low-level source 40 therefore feeds the Q phase-shift devices through distributions of the same delay, Q being equal to 4 in the example of FIG. 4. When these phase-shift systems are in the same state, all the amplifiers 411, 421, 431, 441 are fed in phase.

FIG. 5 illustrates the various binary combinations 0/1 making it possible to orient the emission beam in various directions. The emission pathways being fed simultaneously so as to form a beam covering a given angular domain, the orientation of the beam is controlled by the combinations of phase shift.

In the example of this FIG. 5, five examples of phase shifts are presented. When a group of emission antennas 31, 32, 33, 34 is presented with the code 1, this signifies that the breaker 411, 421, 431, 441 of its emission pathway is open, and therefore that a phase shift is applied via the delay line 413, 423, 433, 443 in parallel.

In a first combination 51, the phase-shift codes of the four groups of antennas 31, 32, 33, 34 are all in the 0 state, all the switches are therefore closed and no phase shift is applied. The antenna beam formed on the basis of the antenna system is therefore oriented along the axis of the antenna system. This axis passes through the centre of the groups of antennas 31, 32, 33, 34 and is oriented perpendicularly to the phase plane of the set of these antennas.

In a second combination 52, the phase shifts of the two groups of antennas at the bottom 33, 34 are coded to 1, the others being coded to 0. A phase shift is then applied to the signals emitted by these bottom antennas. The antenna beam is in this case oriented upwards.

In a third combination 53, the phase shifts of the two groups of antennas at the top 31, 32 are coded to 1, the others being coded to 0. A phase shift is then applied to the signals emitted by these top antennas. The antenna beam is in this case oriented downwards.

In a fourth combination 54, the phase shifts of the two groups of left antennas 31, 33 are coded to 1, the others being coded to 0. A phase shift is then applied to the signals emitted by these left antennas. The antenna beam is in this case oriented rightwards.

In a fifth combination 55, the phase shifts of the two groups of right antennas 32, 34 are coded to 1, the others being coded to 0. A phase shift is then applied to the signals emitted by these right antennas. The antenna beam is in this case oriented leftwards.

A device according to the invention then operates as follows. For a given antenna system 22, 23, the antenna beam on reception is formed by CBF by the computation means on the basis of the signals received by each reception antenna 30. For this same system, the antenna beam on emission, being more slender than the search domain to be covered $\Omega$ to be covered by construction, is successively pointed in a number of directions inside this angular sector so as to progressively cover this sector. Each antenna system therefore covers the search domain $\Omega$. Advantageously, the beam is pointed in the various directions by a simplified active electronic scanning system such as illustrated by FIG. 4.

Figure 6:
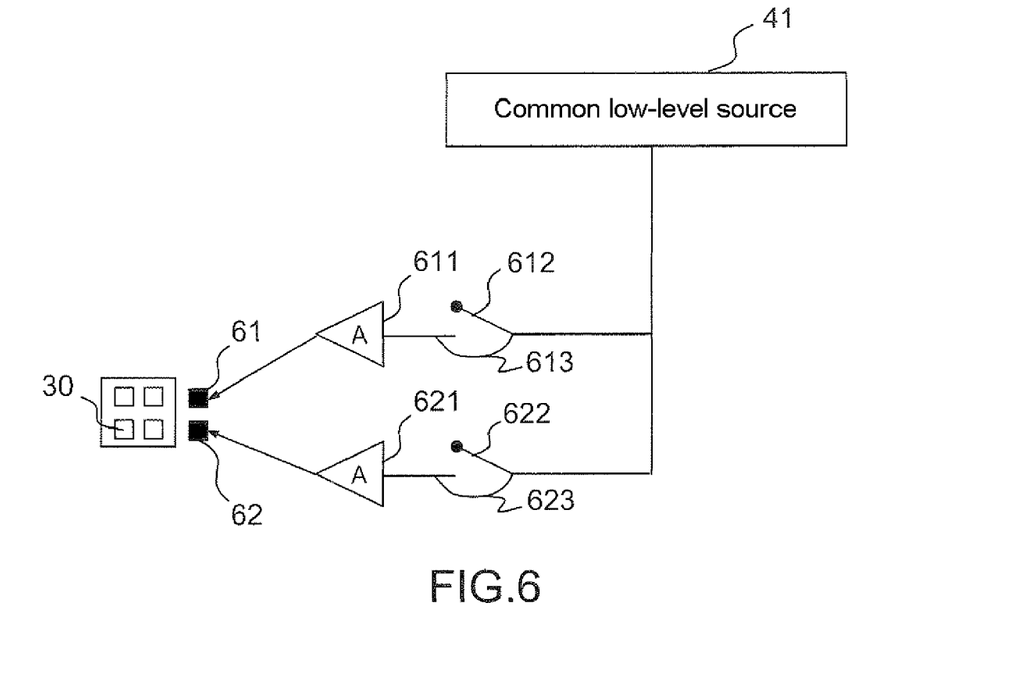
FIG. 6, another exemplary embodiment of a device according to the invention.

FIG. 6 illustrates another exemplary embodiment of an antenna system. In this example, the system comprises:
  for reception, N=4 antennas 30 and M=4 reception pathways;
  for emission, P=2 antennas 35 and Q=2 emission pathways.

In this example a group of antennas 61, 62 is reduced to a single antenna. A common source 41 still feeds the two emission pathways, these pathways having the same structure as the emission pathways of the previous example. In particular, each pathway comprises a power amplifier 611, 621 preceded by a phase-shift system composed of a switch 612, 622 in parallel with a delay line 613, 623.

All the emission or reception antennas have for example the same pattern. The system of FIG. 6 makes it possible to obtain three directional beams on emission at the price of a minor addition in the power feed of each amplifier, this minor addition being the phase-shift system coded on 1 bit 612, 613.

Figure 7:
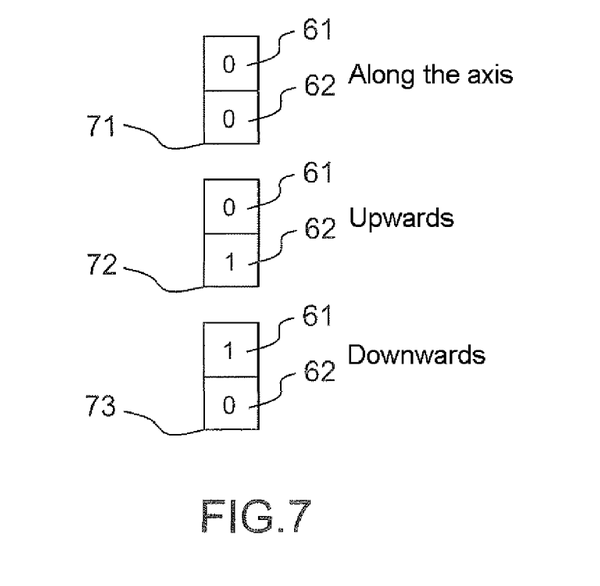
FIG. 7, an exemplary coding of the phase shifts applied in the device of the previous figure.

FIG. 7 illustrates the three possible combinations for applying the phase shifts to the antennas 61, 62.

In a first combination 71, the phase-shift codes of the two antennas 61, 62 are all in the 0 state, the switches are therefore closed and no phase shift is applied. The antenna beam formed on the basis of the antenna system is therefore oriented along the axis of the antenna system.

In a second combination 72, the phase shift of the bottom antenna 62 coded to 1, the phase shift of the other antenna 61 being coded to 0. A phase shift is then applied to the signals emitted by this bottom antenna. The antenna beam is in this case oriented upwards.

In a third combination 73, the phase shift of the top antenna 61 coded to 1, the phase shift of the other antenna 62 being coded to 0. A phase shift is then applied to the signals emitted by this top antenna. The antenna beam is in this case oriented downwards.

As indicated previously, the invention uses a method of CBF in which the domain to be covered $\Omega$, covered by an antenna system, is subdivided into a certain number of sub-domains w. A sub-domain $\omega$ is covered by the beam of the antenna system, oriented successively in a certain number of directions as described in the exemplary embodiments of FIGS. 3, 4 and 6.

According to the invention, a hybrid system is therefore achieved, composed of a CBF on reception and of an electronic active scan on emission. This electronic scan on emission is achieved at low cost as shown by the exemplary embodiments of FIGS. 4 and 6. The number of sub-domains remains moreover fairly small so that the sub-domain observation time remains sufficient to perform notably efficacious Doppler processings having regard to the large domain to be covered.

Moreover, the subdivision of the total domain $\Omega$ makes it possible to adapt the range during surveillance as a function of the direction. A significant range may, for example, be required along the horizontal axis whereas a lesser range may suffice at large angles of elevation, positive or negative. For example, if the time to explore the total domain $\Omega$ is T, it is possible to allocate 0.5 T to the observation of the zone with zero elevation and 0.25 T to the two zones with large elevation. It is thus possible to allocate an optimal allocation of the integration time.

As regards the timing of the surveillance function with respect to the tracking function, as long as there is no detected target, the sub-domains of aperture $\omega$ can be explored cyclically with a total cycle time of T. If a target is detected, the surveillance exploration ceases and the emission beam is temporarily pointed for a given duration $T_p$ towards the direction of the detection: a track is then opened. It is noted that if $T_p$ is equal to T, the required angular precision is obtained after a number $$k_\omega = k\sqrt{\frac{\omega}{\Omega}}$$

of measurements whereas the CBF solution described in relation to FIG. 1 requires k measurements. The forward progress of the target during these $k_\omega$ measurements is therefore reduced by the factor $$\sqrt{\frac{\omega}{\Omega}},$$

therefore the range R' necessary for the track aperture is now only:

$$R' = R + kV_{RR}T\sqrt{\frac{\omega}{\Omega}} \tag{4}$$

The constraint on the emission power is therefore reduced, for one and the same precision, since the range required on the first detection is reduced. Stated otherwise, the gain on emission during tracking is increased. This results in a greater signal-to-noise ratio, S/N, for one and the same integration time and consequently increased precision during tracking.

The exemplary embodiments of the emission pathways of FIGS. 4 and 6 present phase shifters with one two states, it is of course possible to provide phase shifters with n states, n being greater than or equal to two.

The invention claimed is:

1. A radar device for detecting and/or tracking aerial targets fitted to an aircraft, comprising at least:
   means for emitting microwave-frequency signals;
   means for receiving signals reflected by a target;
   computation means;
   a plurality of antenna systems disposed around the aircraft, an antenna system comprising a set of emission antennas coupled to the emission means and a set of reception antennas coupled to the reception means, each antenna system being dedicated to the coverage of a given angular sector $\Omega$, wherein
   for a given antenna system, the computation means forming the antenna beam on reception by computational beamforming (CBF) on the basis of the signals received by the reception antennas and the antenna beam on emission is pointed by an electronic scanning system in a number greater than or equal to two directions inside the given angular sector $\Omega$, said antenna system comprising at least:
   a set of P emission antennas, P being greater than or equal to 1, coupled to Q emission pathways, Q being greater than or equal to 1, the antennas being grouped into Q groups, each group being fed through an emission pathway;
   an array of N reception antennas, associated with a number M of reception pathways, and
   the electronic scanning system being composed of phase shifters with n states disposed in the emission pathways, the pathways being fed simultaneously through one and the same microwave-frequency signal, the orientation of the beam is dependent on the combination of the phase shifts on the various phase shifters;
   the phase shifters are phase shifters with two states;
   the orientation of the beam is obtained by binary combination of two microwave-frequency paths of different lengths upstream of power amplifiers; and
   a phase shifter comprises a delay line and a switch in parallel.

2. The device according to claim 1, wherein the given angular sector $\Omega$ is the search domain to be covered by the said device.

* * * * *